United States Patent
Fenzl et al.

(10) Patent No.: US 7,410,453 B2
(45) Date of Patent: Aug. 12, 2008

(54) METHOD OF SEALING A ZIPPER WITH CONCAVE BRIDGES OR BASES USING CONVEX SEALING BARS

(75) Inventors: Eric Fenzl, Loganville, GA (US); Gregory Crunkleton, Nicholson, GA (US)

(73) Assignee: Illinois Tool Works Inc., Glenview, IL (US)

( * ) Notice: Subject to any disclaimer, the term of this patent is extended or adjusted under 35 U.S.C. 154(b) by 240 days.

(21) Appl. No.: 11/451,092

(22) Filed: Jun. 12, 2006

(65) Prior Publication Data

US 2007/0289254 A1    Dec. 20, 2007

(51) Int. Cl.
*B31B 1/90* (2006.01)
*B65B 61/18* (2006.01)
*B32B 37/10* (2006.01)

(52) U.S. Cl. .................. 493/213; 53/412; 53/133.4; 53/139.2; 156/73.1; 156/580.2; 156/581; 156/583.1; 493/215; 493/927

(58) Field of Classification Search ............. 53/412, 53/133.4, 139.2; 493/212, 213, 215, 927; 156/73.1, 580, 580.1, 580.2, 581, 583.1; 383/61.2, 63; 24/585.12

See application file for complete search history.

(56) References Cited

U.S. PATENT DOCUMENTS

| | | | | | |
|---|---|---|---|---|---|
| 2,641,037 | A | * | 6/1953 | Gossner | ............ 24/384 |
| 3,457,132 | A | * | 7/1969 | Tuma et al. | ............ 156/580.2 |
| 3,613,524 | A | * | 10/1971 | Behr et al. | ............ 493/214 |
| RE28,969 | E | * | 9/1976 | Naito | ............ 383/65 |
| 4,430,070 | A | * | 2/1984 | Ausnit | ............ 493/215 |
| 4,812,074 | A | * | 3/1989 | Ausnit et al. | ............ 493/213 |
| 4,927,474 | A | * | 5/1990 | Pawloski | ............ 493/927 |
| 5,035,766 | A | * | 7/1991 | More et al. | ............ 156/581 |
| 5,412,924 | A | * | 5/1995 | Ausnit | ............ 53/412 |
| 5,425,216 | A | * | 6/1995 | Ausnit | ............ 53/412 |
| 5,768,852 | A | | 6/1998 | Terminella et al. | |
| 6,032,437 | A | * | 3/2000 | Bois | ............ 53/412 |
| 6,131,370 | A | | 10/2000 | Ausnit | |
| 6,224,528 | B1 | | 5/2001 | Bell | |
| 6,553,740 | B2 | | 4/2003 | Delisle | |
| 6,691,491 | B2 | * | 2/2004 | Terminella et al. | ............ 53/133.4 |
| 6,868,649 | B1 | | 3/2005 | Farid | |
| 6,871,473 | B1 | * | 3/2005 | Dutt et al. | ............ 53/133.4 |
| 7,025,841 | B2 | | 4/2006 | Owen | |
| 2004/0089407 | A1 | * | 5/2004 | Halewood | ............ 156/581 |

* cited by examiner

*Primary Examiner*—Stephen F. Gerrity
(74) *Attorney, Agent, or Firm*—Day Pitney LLP

(57) ABSTRACT

The present invention includes a method and apparatus wherein webless zipper is provided with concave seal bridges. These concave seal bridges are complementary in shape to convex sealing bars. This captures or positions the seal bridges of the zipper profiles resulting in improved alignment of the profiles and improved performance of the manufacturing apparatus.

20 Claims, 2 Drawing Sheets

METHOD OF SEALING A ZIPPER WITH CONCAVE BRIDGES OR BASES USING CONVEX SEALING BARS

BACKGROUND OF THE INVENTION

1. Field of the Invention

The present invention relates to a zipper used for reclosable packages and the method of sealing the zipper to the reclosable package. In particular, the present invention relates to a concave shaped seal base or bridge on a webless zipper profile and a corresponding convex sealing bar to seal the webless zipper to the reclosable package in a form fill seal or similar apparatus.

2. Description of the Prior Art

In the prior art, the design and manufacture of reclosable packages, particularly by form fill seal methods, is well developed. However, further improvements leading to both decreased set-up and maintenance and higher manufacturing throughput are always desired.

In particular, flat seal bars are used for the sealing of webless zippers in form fill seal apparatus. However, this requires a proper set-up procedure in order to avoid manufacturing problems relating to the seal between the base or bridge and the package wall. Such problems include deficiencies in the tracking of the zipper relative to the seal bars, deficiencies in the uniformity of the seal and sensitivity to misaligned sealing equipment.

Any wandering or misalignment of the profile may create a seal which is biased to one side.

OBJECTS AND SUMMARY OF THE INVENTION

It is therefore an object of this invention to provide a method and apparatus which can reduce the set-up and maintenance required for form fill seal apparatus, particularly those employing webless zippers.

It is therefore a further object of this invention to improve the tracking and alignment of form fill seal apparatus, particularly those employing webless zippers.

These and other objects are attained by providing webless zipper with seal bases bridges (that is, the area to be sealed to the film) which have concave cross section and likewise providing seal bars with a corresponding complementary convex cross section. When the seal bars close around the zipper profile, the profile is locked in place thereby creating a more uniform seal, which is resistant to misalignment.

BRIEF DESCRIPTION OF THE DRAWINGS

Further objects and advantages of the invention will become apparent from the following description and from the accompanying drawings, wherein.

DETAILED DESCRIPTION OF THE PREFERRED EMBODIMENTS

Figure 1:
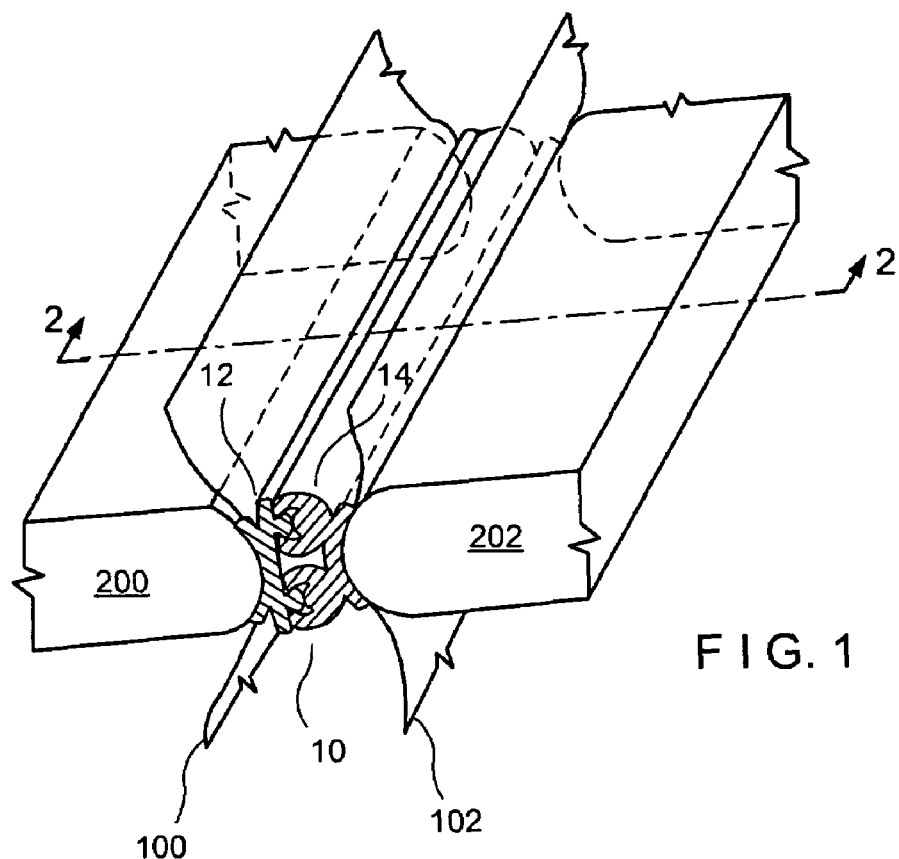
FIG. 1 is a perspective view of the seal bars and webless zipper of the present invention, wherein the webless zipper includes a bridge between two interlocking elements
Figure 2:
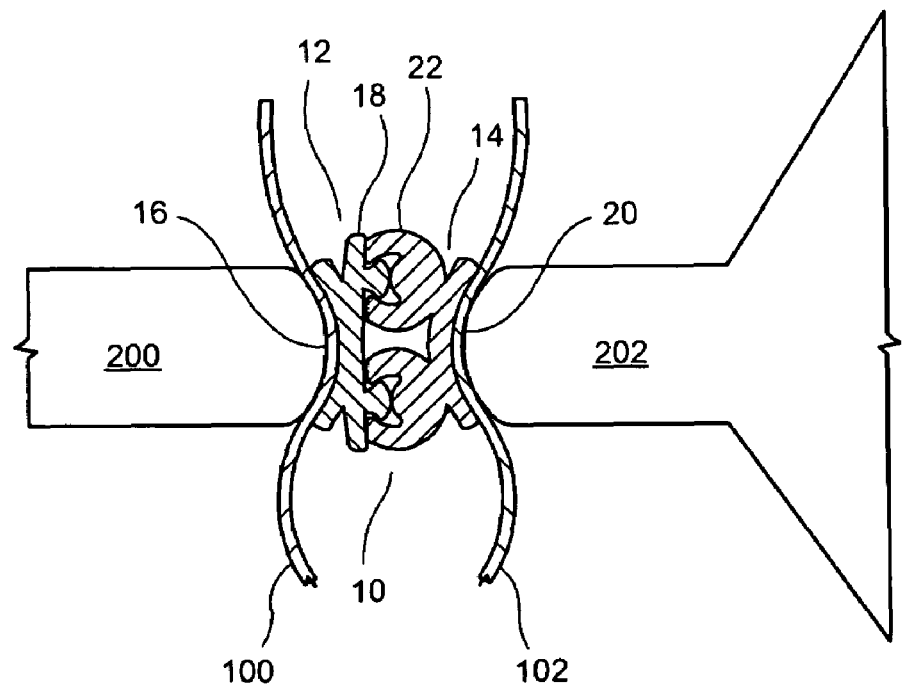
FIG. 2 is a cross-sectional view along plane 2-2 of FIG. 1.

Referring now to the drawings in detail wherein like numerals indicate like elements throughout the several views, one see that FIG. 1 is a perspective view of the webless zipper 10 being sealed to the interior of web sheets 100, 102 by seal bars 200, 202, while FIG. 2 is a cross-sectional view of the same. Web sheets 100, 102 may be formed separate pieces of web sealed together or a single piece of web which is folded. This operation is typically done in a form fill seal manufacturing process but may be applied to other similar manufacturing processes.

Zipper 10 includes a first profile 12 and second profile 14, both of which are typically webless (i.e., without flanges). First profile 12 includes first concave seal bridge 16 and first interlocking element 18. First interlocking element 18 includes first portion 17 and second portion 19 with first concave seal bridge 16 therebetween. Likewise, second profile includes second concave seal bridge 20 and second interlocking element 22. Second interlocking element 22 includes first portion 21 and second portion 23 with second concave seal bridge 20 therebetween. First and second interlocking elements 18, 22 interlock with each other (that is, first portions 17, 21 interlock with each other and second portions 19, 23 interlock with each other) to close the reclosable package and separate from each other to open the reclosable package, as known to those skilled in the art.

First and second concave seal bridges 16, 20 have a concave shape (when viewed from the side opposite to that of the interlocking elements 18, 22). This concave shape or cross section is complementary to the convex shape or cross section of seal bars 200, 202. This captures or positions the first and second concave seal bridges 16, 20 of first and second profiles 12, 14 thereby locking the profiles 12, 14 in place against first and second web sheets 100, 102 as first and second profiles 12, 14 are sealed to first and second web sheets 100, 102, respectively, typically using heat or ultrasonic energy, in the manufacture of a reclosable package. This prevents or minimizes the tendency of the profiles 12, 14 to wander or misalign. This capturing therefore prevents or minimizes any tendency to create a seal biased to one side and results in a more uniform seal between the first and second profiles 12, 14 and the first and second web sheets 100, 102.

Figure 3:
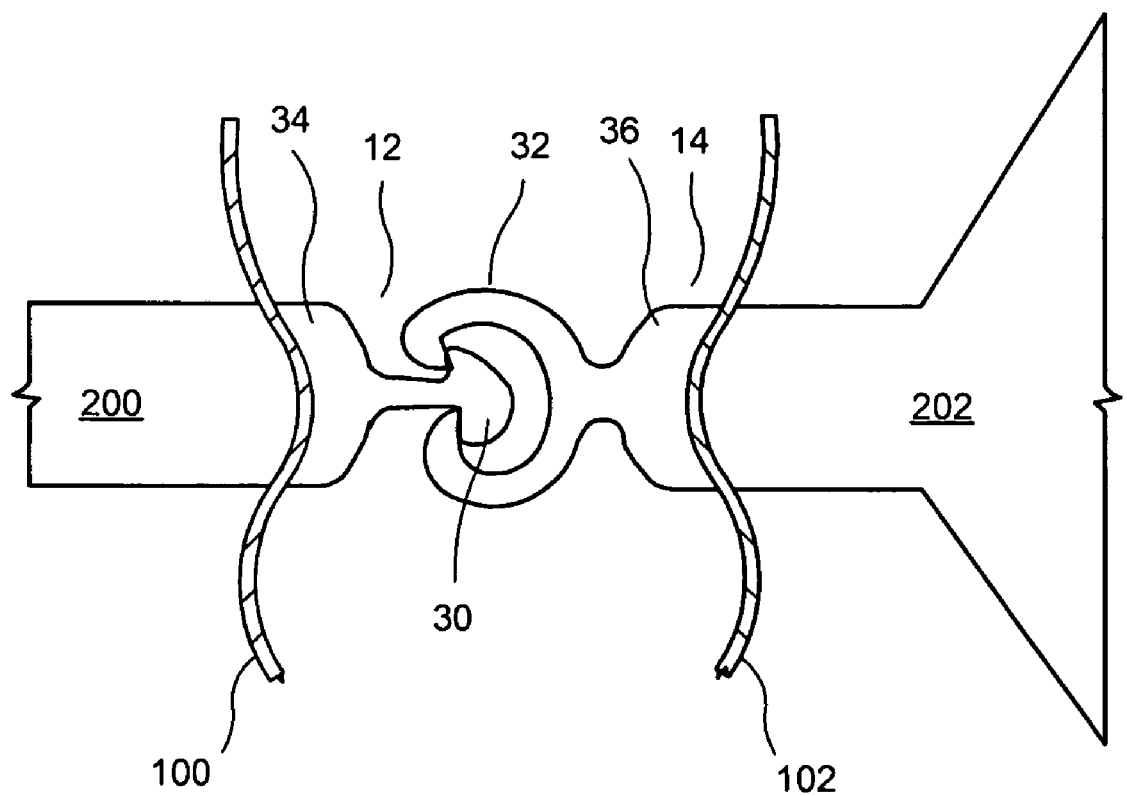
FIG. 3 is an alternative cross section along plane 2-2 of FIG. 1, wherein the zipper includes a single pair of interlocking elements and a base, rather than a bridge.

FIG. 3 discloses an alternative cross section of zipper 10, wherein first profile 12 includes single male interlocking element 30 and base 34 and second profile 14 includes single female interlocking element 32 and base 36.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method of sealing zipper profiles to a web, including the steps of:
   providing a zipper including first and second profiles, the first and second profiles including respective first and second interlocking elements and first and second concave bridges;
   providing web material;
   providing first and second convex sealing bars which urge the web material against the concave bridges; and
   sealing the first and second concave bridges to the web material by the convex sealing bars.

2. The method of claim 1 wherein the concave bridges are complementary in shape to the convex sealing bars.

3. The method of claim 1 wherein the first and second convex sealing bars position the first and second concave bridges.

4. The method of claim 1 wherein the first and second interlocking elements are subsequently separated to open a reclosable package and interlocked together to close the reclosable package.

5. The method of claim 1 wherein the first and second concave bridges are sealed to an interior side of the web material.

6. The method of claim 1 wherein the first and second zipper profiles are free of flanges.

7. The method of claim 1 wherein the first zipper profile includes a first bridge and a first interlocking element and the second zipper profile includes a second bridge and a second interlocking element, wherein the first and second interlocking elements each include first and second portions, wherein the first portions interlock with each other and the second portions interlock with each other.

8. The method of claim 7 wherein the first and second portions of the first interlocking profile are separated by the first bridge and wherein the first and second portions of the second interlocking profile are separated by the second bridge.

9. The method of claim 1 wherein the sealing step is performed by heat.

10. The method of claim 1 wherein the sealing step is performed by ultrasonic energy.

11. A method of sealing zipper profiles to a web, including the steps of:

providing a zipper including first and second profiles, the first and second profiles including respective first and second interlocking elements and first and second concave bases;

providing web material;

providing first and second convex sealing bars which urge the web material against the concave bases; and sealing the first and second concave bases to the web material by the convex sealing bars.

12. The method of claim 11 wherein the concave bases are complementary in shape to the convex sealing bars.

13. The method of claim 11 wherein the first and second convex sealing bars position the first and second concave bases.

14. The method of Claim 11 wherein the first and second interlocking elements are subsequently separated to open a reclosable package and interlocked together to close the reclosable package.

15. The method of claim 11 wherein the first and second concave bases are sealed to an interior side of the web material.

16. The method of claim 11 wherein the first and second zipper profiles are free of flanges.

17. The method of claim 11 wherein the first zipper profile includes a first base and a first interlocking element and the second zipper profile includes a second base and a second interlocking element.

18. The method of claim 17 wherein the first interlocking element is a male element and the second interlocking element is a female element.

19. The method of claim 11 wherein the sealing step is performed by heat.

20. The method of claim 11 wherein the sealing step is performed by ultrasonic energy.

* * * * *